Feb. 6, 1962 — W. L. BEHRLE — 3,019,686
DOUBLE NAIL UNIT
Filed May 5, 1958
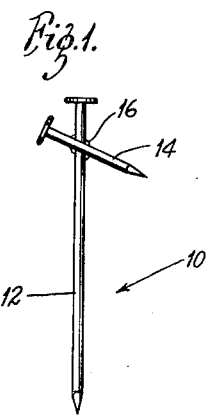
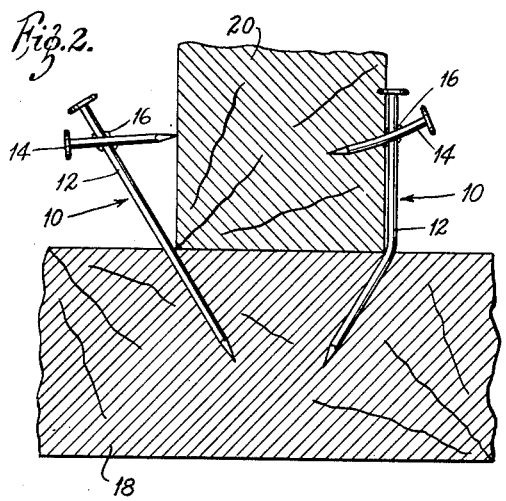
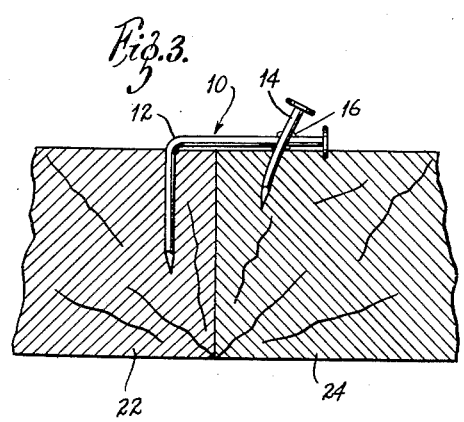
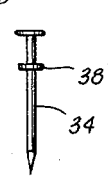
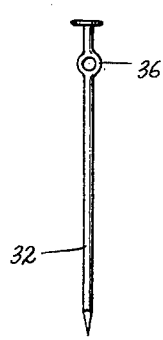
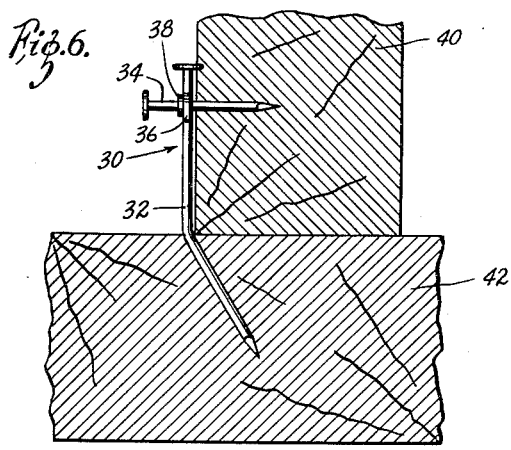
INVENTOR:
WILLIAM L. BEHRLE,
By Kingsland, Rogers & Ezell
ATTORNEYS

United States Patent Office 3,019,686
Patented Feb. 6, 1962

3,019,686
DOUBLE NAIL UNIT
William L. Behrle, Rte. 1, Fenton, Mo.
Filed May 5, 1958, Ser. No. 732,864
1 Claim. (Cl. 85—10)

The present invention relates generally to securing means, such as nails, and more particularly to a combination nail or nail unit including multiple bodies and driving heads, and to a method of nailing.

Heretofore, many forms and weights of nails have been devised, but there has long existed the need of a nail unit for satisfactorily toe-nailing lumber together in a manner insuring against splitting the toe nailed board. The need extends as well to suitable means for securing together abutting pieces of lumber, partition and wall members, and the like. Also, there has been a need for a nailing arrangement that would facilitate subsequent dismantling of the nailed structure.

Therefore, an object of the present invention is to provide a novel nail unit which is particularly adapted to secure lumber elements together in a manner minimizing the chance of splitting them, and insuring ready dismantling without damage thereto.

In brief, the present novel nail unit comprises a primary nail with which is associated a secondary nail, the former usually being heavier and longer than the latter. The secondary nail is disposed across the primary nail to provide a selective angle between head portions thereof. In a preferred embodiment, the primary and secondary nails are welded or otherwise secured together to form an integrated unit. A modification includes a secondary nail separate from the primary nail and associated through an eyelet formed in one of said nails.

Another object is to provide a novel nail unit which may be employed to secure a vertical piece of lumber to a horizontally disposed piece in which the securing action is partly clamping, in effect.

Another object is to provide a multi-use nail unit which incorporates a primary nail and a secondary nail.

Another object is to provide a novel nail unit of integrated structure incorporating a large primary nail and a secondary smaller nail, the several elements of which are adapted to be driven into separate adjacent lumber pieces.

Another object is to provide a novel method of nailing that minimizes splitting of the lumber and facilitates subsequent dismantling.

The foregoing and other objects and advantages are apparent from the following description taken with the accompanying drawing, in which:

FIGURE 1 is a plan view of a nail unit incorporating the principles of the present invention;

FIGURE 2 is a cross-sectional view through a horizontal lumber piece and an adjacent vertical lumber piece illustrating one of the present nail units driven only into the horizontal lumber piece and a second nail unit driven into both horizontal and vertical pieces;

FIGURE 3 is a cross-sectional view through two abutting lumber pieces illustrating a nail unit of the present invention driven into said lumber pieces in a manner to secure the same together;

FIGURE 4 is a plan view of a secondary nail forming part of a modified nail unit;

FIGURE 5 is a plan view of a primary nail forming part of the modified nail unit; and FIGURE 6 is a cross-sectional view through a horizontal lumber piece and a vertical lumber piece disposed thereon, illustrating the modified unit of FIGURES 4 and 5 operatively driven into the lumber pieces.

Referring to the drawing more particularly by reference numerals, and considering FIGURES 1–3, 10 indicates generally a nail unit incorporating the principles of the present invention. The nail unit 10 includes a primary nail 12 and a secondary nail 14 which are welded at 16 to dispose the secondary nail 14 across the primary nail 12 to provide an angle between the head portions of less then ninety degrees in the preferred relationship. One of the nails 12 and 14 may be flattened at the point of weld 16, although this is not essential.

In FIGURE 2 are shown a horizontally disposed lumber piece, such as a plate 18, and a vertically disposed lumber piece, such as a stud 20, into the former of which are driven two nail units 10. The left nail unit 10 shows the relationship of the primary nail 12 and the secondary nail 14 after the former is driven into the plate 18 and before the latter is driven into the stud 20. The right nail unit 10 illustrates the relationship of the primary nail 12 and the secondary nail 14 after the complete nail unit driving action. It will be noted that the secondary nail 14 is illustrated as curved in the portion driven into the vertical lumber piece 20. This effect occurs due to the fact that the upper portion of the primary nail 12 is moved into vertical position in an arc. It is contemplated that this distortion of the secondary nail 14 may be overcome by forming it on a predetermined arc, but it has been found that the distortion effect is beneficial, since a downwardly effective clamping action is established which more firmly maintains the vertical lumber piece 20 in position. The action may involve some longitudinal displacement of the main nail 12.

In FIGURE 3, the nail unit 10 is illustrated securing two adjacent lumber pieces 22 and 24 together in abutted relation. The relationship of the secondary nail 14 to the primary nail 12 is similar to that shown in FIGURE 2, although the primary nail 12 is bent through a full ninety degrees.

In FIGURES 4–6 is shown a modified nail unit 30 which comprises a primary nail 32 and a secondary nail 34. The primary nail 32 is formed with an eyelet 36, which may be formed in a flattened area or as illustrated. The secondary nail 34 includes a flange 38.

In FIGURE 6, the modified nail unit 30 is illustrated as securing a vertical lumber piece, such as the stud 40, to a horizontal lumber piece, such as a plate 42. The primary nail 32 is driven into the horizontal lumber piece 42 from the angle illustrated by the lower portion thereof and is then forced into the substantially vertical position shown. Thereafterwards, the secondary nail 34 is driven through the eye 36 into the vertical lumber piece 40, until the flange 38 firmly engages the main nail. It is desirable that the eye 36 loosely receive the secondary nail, so as to eliminate the problem of arcuacy of the displacement of the eye as it is bent toward the stud 40. This is especially true where the secondary nail 34 is driven in place before the principal nail is bent toward the stud. The flange 38 may be made large enough to accommodate the larger eye size without passing through it.

These nails are especially useful in toe-nailing lumber pieces together, as typified by the stud-sill attachments illustrated. Conventional nailing methods, comprising driving nails at an angle across the ends of the stud and into the plate, result too frequently in splitting the stud. The present nails avoid this entirely, because the principal nails are not driven into the stud, more than perhaps to groove it at its tip edge; and the secondary nails enter the stud well above its end, so as to minimize splitting. And with a projecting head end left on the secondary nail 14 or 34, outwardly of the weld or eyelet, respectively, subsequent dismantling of the structure is made much easier and can be done so as to preserve the lumber in best condition for re-use.

It will be readily understood from the foregoing that the nail units 10 and 30 have particular use in temporary structures, such as concrete forms, and in a method of toe-nailing lumber or the like, including the first step of driving one or more nails into the transverse members at the location of the edge of the abutting member, and the second step of driving the secondary nails into the abutting members inward from their ends, where splitting is minimized. For dismantling the structures, the heads of the secondary nails 14 and 34 can be readily engaged by a crowbar, hammer or other tool for removal of the nail units 10 and 30, respectively, without damage to the lumber. Hence, the lumber can be used repeatedly. The nail units 10 and 30 can be used in permanent work, as in partition walls and the like, where the structure is concealed or a finished surface is not required.

The nail unit 10 may be formed as an integral structure, as by casting, and the nail unit 30 may be formed with an eye in the secondary nail 34 instead of in the primary nail 32.

It is apparent that there has been provided a novel nail unit which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claim which follows.

What is claimed is:

A double nail unit comprising a primary nail and a secondary nail, each nail having an elongated body with a head at one end normal to the body and a point at the other end, the primary nail having an enlarged portion through its body at a point spaced from the head of the primary nail, an opening through the enlargement large enough to receive the body of the secondary nail, the body of the secondary nail being received within the opening of the enlargement, the body of the secondary nail being rigidly connected to the body of the primary nail, the bodies of the primary and secondary nails being disposed at an acute angle to one another with the acute angle being defined by the portions of the bodies of the nails which extend from the point of their connection toward their respective heads, the head of each nail being disposed normal to its body so that each nail may be driven by a driving tool, the head of each nail being spaced from its point of connection to the other nail by a distance sufficient to enable the engagement by each head of a withdrawing tool, the heads being spaced far enough from one another to provide freedom from interference by either head with the engagement with either head by the withdrawing tool, the connection between the nails being sufficiently strong to remain intact against the force of the withdrawing tool against the head of the secondary nail.

References Cited in the file of this patent

UNITED STATES PATENTS

| 359,344 | Burt | Mar. 15, 1887 |
| 831,179 | McDonagh | Sept. 18, 1906 |
| 1,537,302 | Hojnowski | May 12, 1925 |

FOREIGN PATENTS

| 329,721 | France | Aug. 5, 1903 |
| 772,118 | France | Oct. 26, 1933 |